United States Patent
Bauer

(10) Patent No.: US 7,506,897 B2
(45) Date of Patent: Mar. 24, 2009

(54) PLUG-IN COUPLING FOR CONNECTING A FLUID CONDUIT TO A PIPE

(75) Inventor: Andreas Bauer, Maintal (DE)

(73) Assignee: NORMA Germany GmbH, Maintal (DE)

( * ) Notice: Subject to any disclaimer, the term of this patent is extended or adjusted under 35 U.S.C. 154(b) by 110 days.

(21) Appl. No.: 11/027,529

(22) Filed: Dec. 30, 2004

(65) Prior Publication Data
US 2005/0161946 A1    Jul. 28, 2005

(30) Foreign Application Priority Data
Jan. 24, 2004    (DE)    .................. 10 2004 003 693

(51) Int. Cl.
*F16L 37/00*    (2006.01)
(52) U.S. Cl. .................... 285/305; 285/403
(58) Field of Classification Search ................ 285/321, 285/319, 305, 307–310, 313, 317, 403, 902
See application file for complete search history.

(56) References Cited

U.S. PATENT DOCUMENTS

| | | | | |
|---|---|---|---|---|
| 3,948,547 A | * | 4/1976 | Gache | 285/317 |
| 4,863,201 A | * | 9/1989 | Carstens | 285/317 |
| 5,090,747 A | * | 2/1992 | Kotake | 285/305 |
| 5,494,074 A | * | 2/1996 | Ramacier et al. | 137/614.04 |
| 5,586,792 A | * | 12/1996 | Kalahasthy et al. | 285/319 |
| 5,855,399 A | * | 1/1999 | Profunser | 285/305 |
| 5,941,577 A | * | 8/1999 | Musellec | 285/317 |
| 5,975,489 A | * | 11/1999 | deCler et al. | 251/149.1 |
| 6,206,435 B1 | * | 3/2001 | Le Clinche | 285/305 |
| 6,840,548 B2 | * | 1/2005 | Lacroix | 285/308 |
| 6,926,312 B2 | * | 8/2005 | Lacroix et al. | 285/317 |
| 2002/0140228 A1 | * | 10/2002 | Lacroix et al. | 285/317 |

FOREIGN PATENT DOCUMENTS

| | | |
|---|---|---|
| DE | 196 09 925 | 9/1997 |
| EP | 1 143 187 | 10/2001 |
| WO | 98/59192 | 12/1998 |

* cited by examiner

*Primary Examiner*—Aaron M Dunwoody
(74) *Attorney, Agent, or Firm*—Friedrich Kueffner

(57) ABSTRACT

A plug-in coupling for connecting a fluid conduit to a pipe has a pipe section having a first end section to be connected to a fluid-conduit and a second end section to receive and lock a pipe. A securing ring is attached to the inner side of the pipe section. At least one sealing ring is inserted into the pipe section and seals the pipe relative to the pipe section. The at least one sealing ring is positionally secured in the pipe section between the securing ring and an inner shoulder of the pipe section. The pipe section has a slot extending in a circumferential direction of the pipe section and a support surface located opposite the slot. The securing ring is inserted into the slot until the securing ring contacts the support surface. A circumferential section of the securing ring is received in the slot.

8 Claims, 4 Drawing Sheets

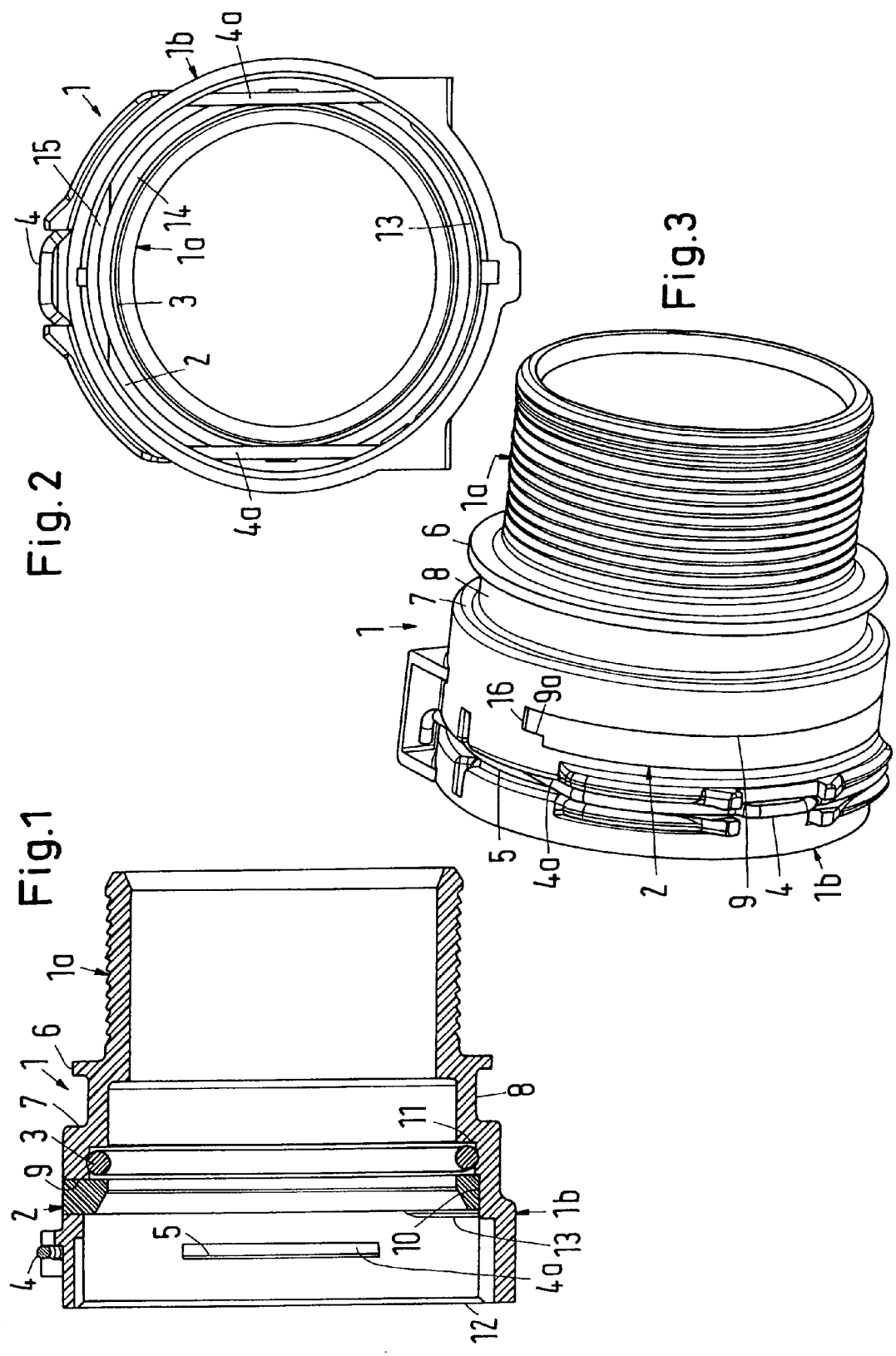

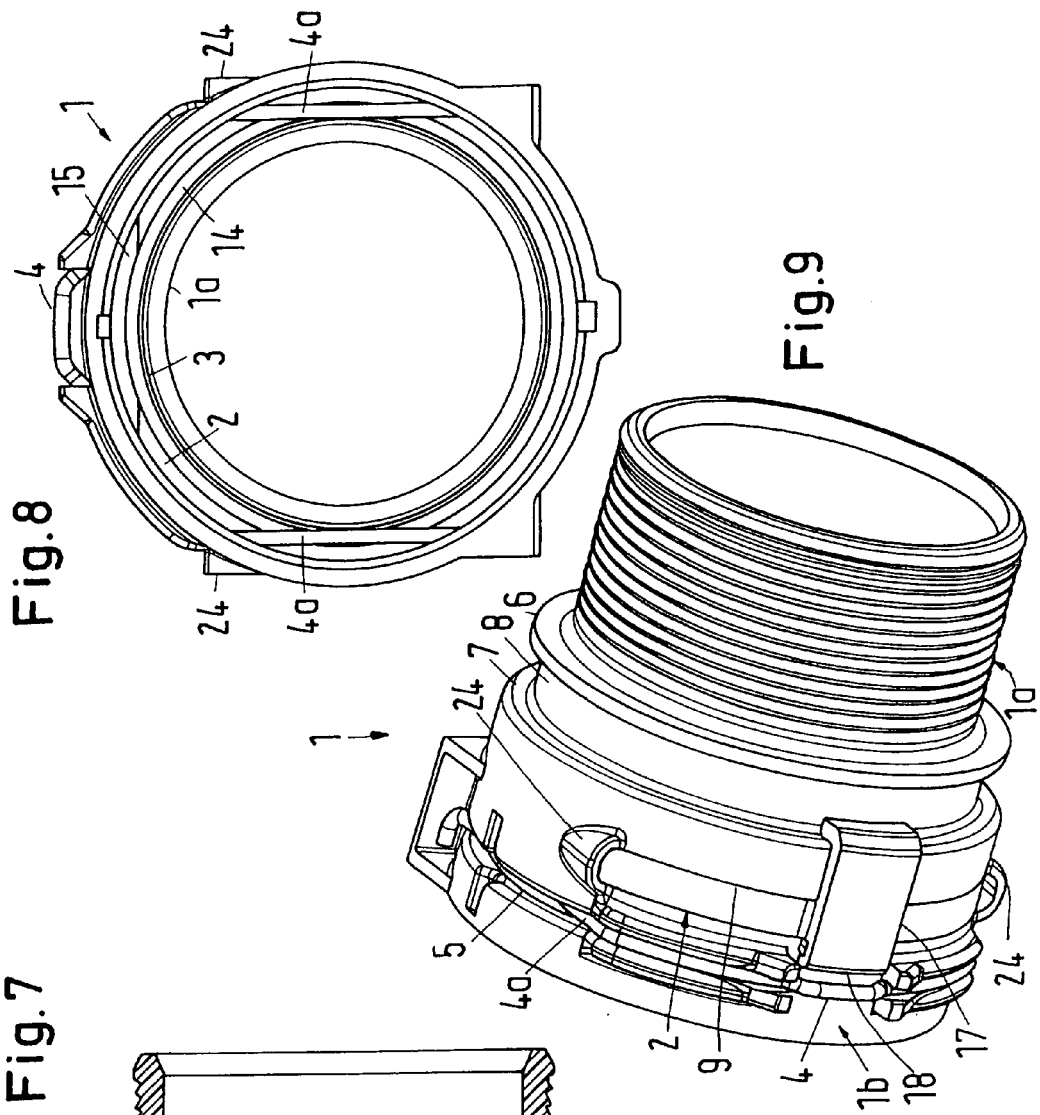

PLUG-IN COUPLING FOR CONNECTING A FLUID CONDUIT TO A PIPE

BACKGROUND OF THE INVENTION

1. Field of the Invention

The invention relates to a plug-in coupling for connecting a fluid conduit to a pipe. The plug-in coupling comprises a pipe section having a first end section connectable to the fluid conduit and having a second end section into which the pipe can be inserted and locked so as to be sealed therein by at least one sealing ring inserted into the pipe section. The sealing ring is secured in its position between a securing ring attached to the pipe section and an inner shoulder of the pipe section.

2. Description of the Related Art

In a known plug-in coupling of this kind (European patent application 1 143 187 A2), the securing ring is provided radially inwardly with a peripheral flat rib which locks in a matching annular groove of the end section for receiving the pipe when combining the securing ring and the pipe section after insertion of the sealing ring. This locking connection cannot withstand high axial forces when pulling out the pipe from the pipe section.

It is also known to weld the securing ring to the pipe section. This type of connection of securing ring and pipe section is also not sufficiently durable because the pipe section cannot always be manufactured to be exactly round and the securing ring cannot be welded uniformly. In this configuration, the securing ring can also be pulled out of the pipe section together with the pipe inserted into the pipe section when releasing the plug-in coupling.

German patent application 196 09 925 A2 (FIG. 1) discloses a plug-in coupling that serves for connecting a fluid conduit to a pipe. The plug-in coupling has a pipe section whose first end section is connected with the fluid conduit and into whose second end section the pipe can be inserted, locked, and sealed therein by at least one sealing ring inserted into the pipe section. The sealing ring is secured in its position between a securing ring attached inside the pipe section and an inner shoulder of the pipe section. The pipe section has a slot extending in the circumferential direction of the pipe section; the slot receives the securing ring that contacts a support surface of the pipe section that is positioned opposite the slot. The securing ring is elastic and provided at its circumference with diametrically opposed radial hooks. It is inserted axially into the pipe section wherein the radial hooks, on the one hand, lock in an inner groove or recess and, on the other hand, in the circumferential slot. In order to remove the securing ring from the pipe section for exchanging the sealing ring, it must either be destroyed or one must attempted to compress it through the slot to such an extent that the radial hooks will become disengaged from the slot. However, since the radial hooks not only engage the slot but also the groove or recess opposite the slot, removal of the securing ring is obviously possible only after it has been destroyed; of course, this is costly with regard to material costs. If the radial hooks were to engage only the slot, no sufficient security in regard to the position of the securing ring and of the sealing ring relative to a frictional entrainment of the sealing ring by means of the pipe when releasing the plug-in coupling would be ensured. Moreover, the removal of the securing ring requires a simultaneous radial compression, and this is extremely difficult.

SUMMARY OF THE INVENTION

It is an object of the present invention to provide a plug-in coupling of the aforementioned kind in which the connection of the securing ring and pipe section is able to withstand greater axial tractive forces.

In accordance with the present invention, this is achieved in that the pipe section has a slot extending in the circumferential direction of the pipe section through which the securing ring is inserted until it contacts a support surface of the pipe section located opposite the slot and is received therein with a circumferential section thereof.

In accordance with this solution, the securing ring is positioned within the slot with a large portion thereof that corresponds to approximately half the circumference of the securing ring (so that it can be guided through the slot) wherein the slot depth corresponds to the wall thickness of the pipe member. The securing ring is therefore very tightly connected in a positive-locking way with the pipe section. The connection withstands therefore higher axial tractive forces in comparison to a locking connection (snap-on connection), that is based also on a frictional connection or an elastic positive locking action, and in comparison to a faulty welding connection.

Preferably, it is ensured that the securing ring on the side facing the opening of the pipe section serving for insertion of the pipe is secured relative to the slot by a flat bead that extends partially circumferentially on the inner side of the pipe section. By means of this bead, an additional positive-locking connection with the pipe section is achieved of the part of the securing ring that is guided through the slot. The axial load capacity of the connection is therefore increased even more.

Preferably, at the side of the pipe section where the slot is located, the securing ring is flush with the outer circumferential surface of the pipe section. The securing ring is therefore not only axially supported by the entire slot depth but also saves mounting space and, when releasing the plug-in coupling, does not impair removal of the securing bracket, conventionally provided for securing the pipe within the pipe section.

Moreover, it can be ensured that the securing ring upon insertion into the slot locks in the end position in the slot or is frictionally secured therein. In this way, the mounted position of the securing ring is secured in the radial direction. Therefore, it cannot accidentally fall out of the slot under the force of gravity.

Moreover, the securing ring can also be provided with a projection on the side facing away from the slot which projection engages a recess at least partially passing through the wall of the pipe section. This increases the axial load capacity of the connection of securing ring and pipe section even more.

In addition, the projection and the recess can be locked relative to one another. This also prevents the securing ring from falling out of the slot under the force of gravity.

Moreover, it is beneficial when the securing ring is provided outside of the slot with axially projecting hooks that engage a shoulder on the outer side of the pipe section on either side of the slot, respectively. These hooks prevent spreading of the slot when exposed to very high axial loads of the connection of pipe section and securing ring.

The ends of the slot are preferably bridged by an outwardly curved stay. In this way, tearing of the ends of the slot by high axial tensile forces is prevented.

Preferably, is also ensured that the securing ring on opposed sides of its circumference is provided with ribs extending parallel to its insertion direction; the ribs are positioned eccentrically to a central plane of the securing ring and fit into matching recesses at the slot ends. This facilitates the position-exact insertion of the securing ring into the slot when the securing ring, as is conventional, is provided with a slanted insertion surface on one side.

BRIEF DESCRIPTION OF THE DRAWING

In the drawing:

FIG. 1 shows an axial section of a first embodiment of a plug-in coupling according to the invention;

FIG. 2 is a front view of the plug-in coupling according to FIG. 1;

FIG. 3 is a perspective view of the plug-in coupling according to FIG. 1;

FIG. 7 shows an axial section of another embodiment of the plug-in coupling according to the invention;

FIG. 8 is a front view of the plug-in coupling according to FIG. 7;

FIG. 9 is a perspective view of the plug-in coupling according to FIG. 7;

DESCRIPTION OF THE PREFERRED EMBODIMENTS

Figure 5:
FIG. 5 shows a bottom view of the securing ring according to FIG. 4.

The embodiment illustrated in FIGS. 1 through 5 of the plug-in coupling according to the invention is comprised of a pipe section 1 of plastic material, a securing ring 2 of plastic material, a sealing ring 3 and a securing bracket 4 of spring steel.

The pipe section 1 has a ribbed end section 1a onto which an elastic fluid conduit can be pushed and, if needed, secured additionally by being clamped by means of a hose clamp.

Into the other end section 1b of the pipe section 1, a pipe (not illustrated) can be inserted, for example, a pipe socket of a radiator of a motor vehicle. The cooling fluid of the motor vehicle flows through the fluid conduit, the pipe section 1, and the pipe or the pipe socket.

The part of the pipe section 1 positioned between the end section 1a and the sealing ring 3 has a greater inner diameter than the end section 1a. The pipe is inserted into the end section 1b until it hits the shoulder of the end section 1a and is sealed by the sealing ring 3 relative to the end section 1b and secured by the securing bracket 4. The securing bracket 4 has legs 4a that extend parallel to a tangent of the end section 1b through slots 5 that are positioned diametrically opposite one another and engage a circumferential groove of the pipe. This means that upon insertion of the pipe into the end section 1b of the pipe section 1 the pipe pushes the legs 4a apart until the pipe has been inserted to such an extent that the legs 4a will lock in the circumferential groove.

A circumferential collar 6 at the end of the end section 1b serves as a stop for the fluid conduit when it is pushed onto the ribbed end section 1a. The collar 6 delimits together with the shoulder 7 of the end section 1b a circumferential groove 8.

The end section 1b of the pipe section 1 has moreover a slot 9 extending in the circumferential direction of the pipe section 1 into which the securing ring 2 is inserted until it contacts a support surface of the pipe section 1 that is positioned opposite the slot 9. The securing ring 2 projects then with its inner circumference so far inwardly that, together with an inner shoulder 11, it delimits an annular groove in which the sealing ring 3 is received and secured in its position by the securing ring 2.

The securing ring 2 is also secured relative to the slot 9 on the side that is facing the opening 12 of the pipe section 1 for insertion of the pipe by a flat bead 13 that extends partially circumferentially on the inner side of the pipe section 1. At the side of the pipe section 1 where the slot 9 is located, the securing ring 2 is flush with the outer circumferential surface of the pipe section 1. In this way, it saves mounting space and does not impair the securing bracket from being pulled out the pipe section 1 in order to release the plug-in connection. Only after removal of the pipe from the pipe section, the securing ring 2 can be pushed out from the interior to the exterior.

Moreover, the securing ring 2 has at its inner side a slanted surface 14 that faces the insertion opening 12 in order to facilitate insertion of the pipe. On one side, the section of the securing ring 2 that is positioned in the slot 9 is also provided with a minimally slanted surface 15 having a slant of only approximately 1.6 degrees, wherein the securing ring at the radial outer edge of the slanted surface 15 is thicker by approximately 0.2 mm in comparison to the radial inner edge and, accordingly, is also correspondingly thicker than the axial width of the slot 9. In this way, the securing ring 2, after insertion into the slot 9, is secured by friction or by press fit in the slot 9 so that it cannot fall out accidentally. Instead of the frictional engagement, the securing ring 2 can also be snapped or locked in place within the slot 9, for example, by oppositely oriented undercuts of the securing ring 2 and the slot 9.

In comparison to an insertion of the securing ring 2 through the opening 12 and locking in the end section 1b by a snap-on connection or by welding, the securing action of the securing ring 2 in the slot 9, optionally additionally assisted by the bead 13, has the advantage that the securing action is more secure so that, when pulling out the pipe from the end section 1b of the pipe section 1, the securing ring 2, possibly also the sealing ring 3, cannot be pulled out by the pipe from the pipe section 1.

Figure 4:
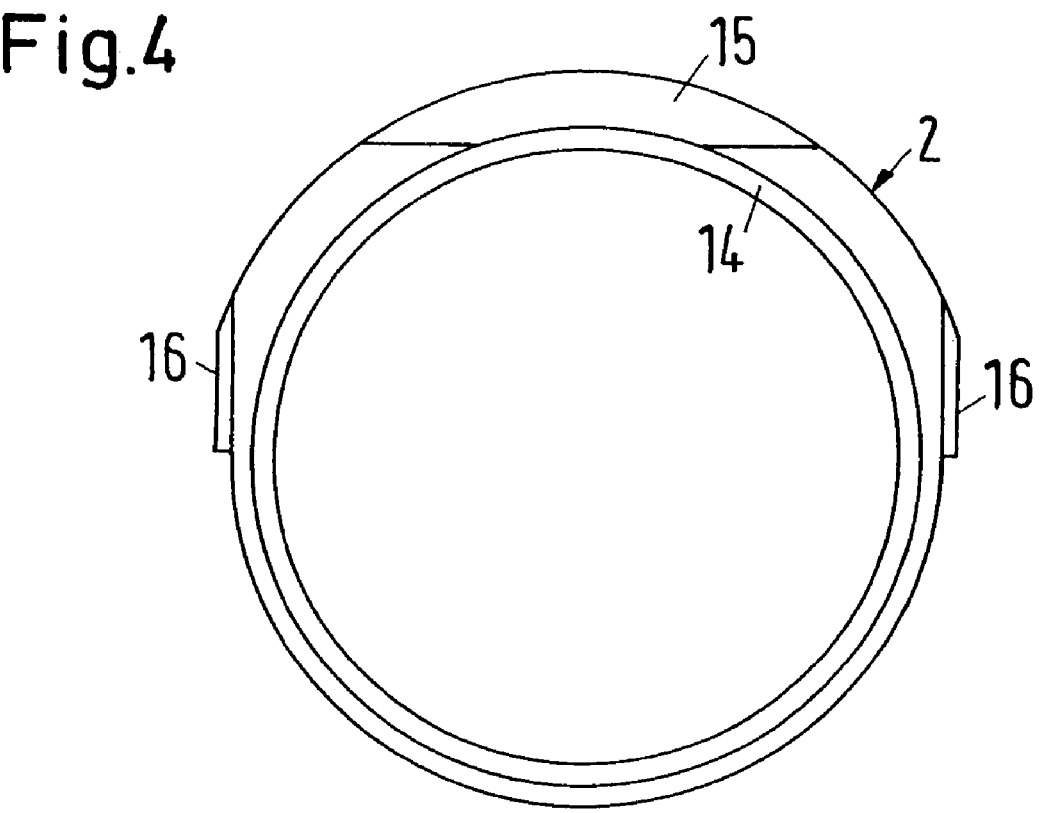
FIG. 4 shows a front view of a securing ring of the plug-in coupling according to FIG. 1.
Figure 6:
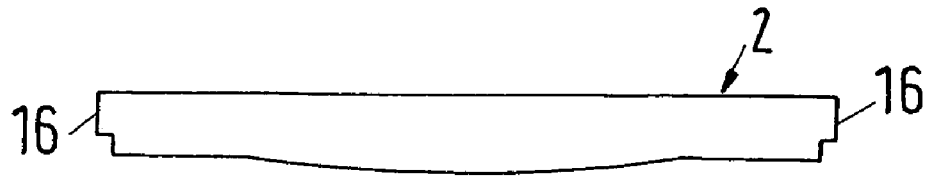
FIG. 6 shows an and view onto the securing ring according to FIG. 4.
Figure 11:
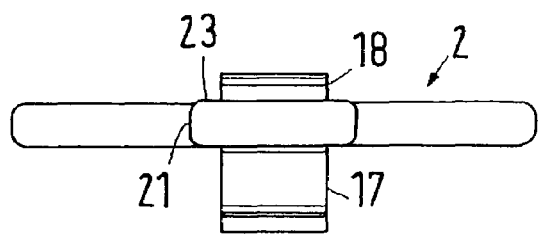
FIG. 11 is a bottom view of the securing ring according to FIG. 10.
Figure 10:
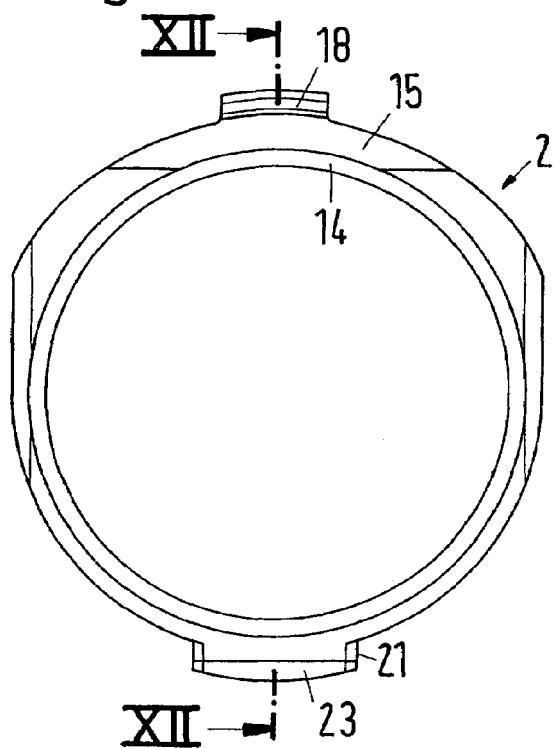
FIG. 10 is a front view of the securing ring of the plug-in coupling according to FIG. 7.
Figure 12:
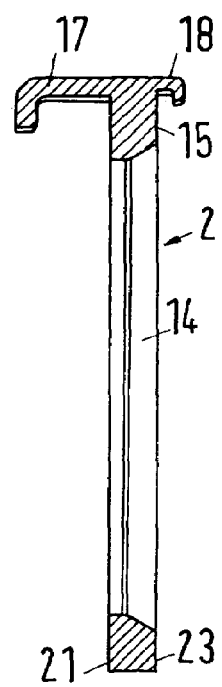
FIG. 12 illustrates a section along section line XII-XII of FIG. 10.

As illustrated in FIGS. 4 to 6, the securing ring 2 is provided on opposed sides of its circumference with parallel ribs 16 extending in the insertion direction. According to FIGS. 5 and 6, the ribs 16 are eccentric relative to the central plane of the securing ring 2 and fit into the corresponding cutouts 9a of the slot ends that are eccentric to the slot plane. This facilitates the position-correct insertion of the securing ring 2 into the slot 9 in such a way that the slanted surface 14 that serves for ensuring a centric insertion of the pipe always faces the opening 12.

The embodiment according to FIGS. 7 through 12 differs from the first embodiment essentially in that the securing ring 2 is provided outside of the slot 9 with axially projecting hooks 17 and 18 that, according to FIGS. 7 and 8, engage the shoulder 7 and a shoulder 19 of the collar 20 on the outer side of the pipe section 1 on either side of the slot 9 and, in this way, prevent the slot 9 from being widened when pulling out the pipe from the pipe section 1 (release of the plug-in coupling). Moreover, the securing ring 2 is provided on the side facing away from the slot 9 with the projection 21 that projects into a recess 22 or hole (FIGS. 7, 10 and 12) of the pipe section 1 that at least partially passes through the wall of the pipe section (in the illustrated embodiment it completely passes through the wall). The projection 21 and the recess 22 are also lockable relative to one another, in this example, by a flat step 23 of the projection 21 and a matching undercut in the recess 22. In addition to the preventive action provided by the slanted surface 15, the securing ring 2 is prevented by this configuration also from accidentally falling out of the slot 9 as a result of the force of gravity.

Moreover, the ends of the slot 9 in the second embodiment are bridged by an outer curved stay 24, respectively, that in addition to the hooks 17, 18, prevent the ends of the slot 9 from tearing open. Such stays 24 can also be provided in the first embodiment.

The ribs 16 of the securing ring 2 of the first embodiment, on the other hand, are not provided in the second embodiment; however, they can be provided also. The cutouts 9a at the ends of the slot 9 can also be provided.

While specific embodiments of the invention have been shown and described in detail to illustrate the inventive principles, it will be understood that the invention may be embodied otherwise without departing from such principles.

What is claimed is:

1. A plug-in coupling for connecting a fluid conduit to a pipe, the plug-in coupling comprising:
    a pipe section having a first end section configured to be connected to a fluid-conduit and having a second end section configured to receive and lock a pipe;
    a closed securing ring attached to the pipe section;
    at least one sealing ring inserted into the pipe section and configured to seal the pipe relative to the pipe section, wherein the at least one sealing ring is positionally secured in the pipe section directly between the securing ring and an inner shoulder of the pipe section
    wherein the pipe section has a slot extending in a circumferential direction of the pipe section and a support surface located diametrically opposite the slot;
    wherein the securing ring is inserted radially with respect to the pipe section into the slot until the securing ring contacts the support surface and wherein a circumferential section of the securing ring is received in the slot; and
    wherein the securing ring on a side remote from the slot has a projection and wherein the pipe section has an at least partially continuous recess, wherein the projection engages the recess.

2. The plug-in coupling according to claim 1, wherein the inner side of the pipe section is provided with a flat bead that extends partially circumferentially on the inner side of the pipe section, wherein a side of the securing ring, which side faces an opening of the pipe section through which opening the pipe is inserted into the pipe section, is secured by the flat bead.

3. The plug-in coupling according to claim 1, wherein the securing ring at a side of the pipe section where the slot is located is flush with an outer circumferential surface of the pipe section.

4. The plug-in coupling according to claim 1, wherein the securing ring when inserted into the slot reaches an end position and is secured in the end position by locking in place or by friction.

5. The plug-in coupling according to claim 1, wherein the projection and the recess are lockable relative to one another.

6. The plug-in coupling according to claim 1, wherein the securing ring has a portion located outside of the slot and wherein the portion is provided with axially projecting hooks, wherein the pipe section has a first shoulder and a second shoulder arranged on opposite sides of the slot, wherein the axially projecting hooks engage across the first and second shoulders, respectively.

7. The plug-in coupling according to claim 1, wherein the slot has ends bridged by outwardly curved stays.

8. The plug-in coupling according to claim 1, wherein the securing ring has ribs on opposed circumferential sides, wherein the ribs extend parallel to a direction of insertion of the securing ring into the slot, wherein the ribs are positioned eccentrically to a central plane of the securing ring, and wherein the slot has slot ends with recesses matching the ribs.

* * * * *